Feb. 27, 1962  A. C. SCINTA  3,022,531
WINDSHIELD CLEANER
Filed Dec. 27, 1955
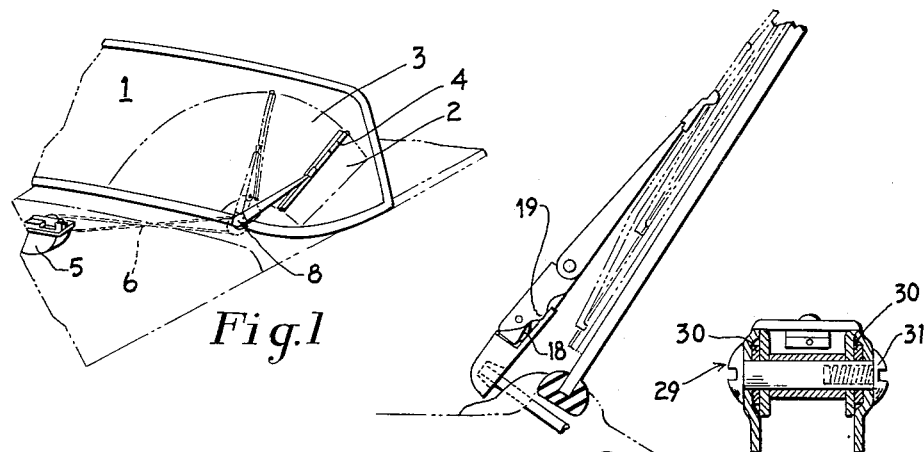
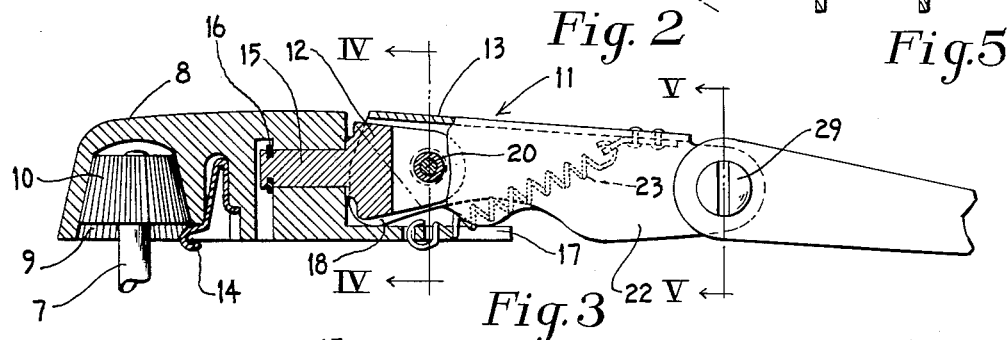
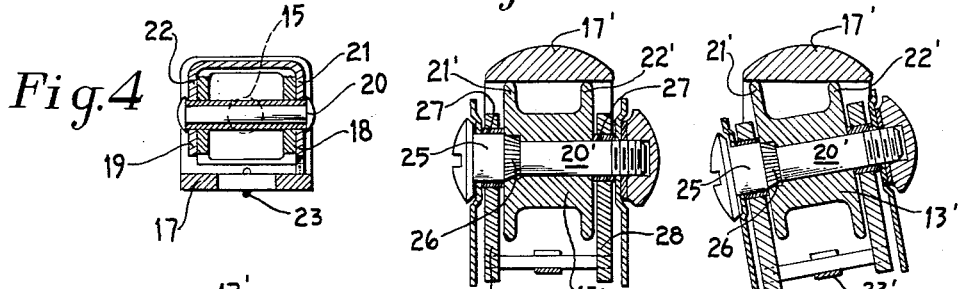
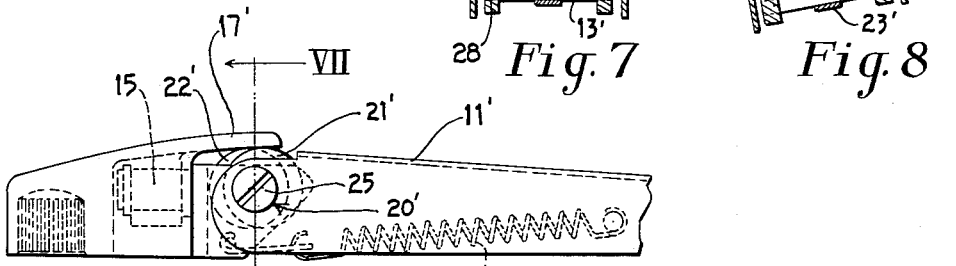
INVENTOR.
Anthony C. Scinta
BY
Bean Brooks Buckley & Bean
ATTORNEYS

United States Patent Office 3,022,531
Patented Feb. 27, 1962

3,022,531
WINDSHIELD CLEANER
Anthony C. Scinta, Hamburg, N.Y., assignor to Trico Products Corporation, Buffalo, N.Y.
Filed Dec. 27, 1955, Ser. No. 555,483
5 Claims. (Cl. 15—250.35)

This invention relates to windshield wiper systems in which a wiper-carrying arm is employed to maintain a wiper blade normal to the windshield surface throughout the arc of travel of the blade across the frontal area and around onto the lateral area of a modern curved glass windshield.

Heretofore, the operation of curved glass windshield wipers has been carried forward by means of a wiper normalizing mechanism cooperating with a position controlling cam that is rigidly anchored to a fixed part of the vehicle body, such as the wiper pivot shaft mounting, this mechanism being more particularly described and claimed in United States Letters Patent No. 2,691,186. The normalizing cam operation requires an arm structure including a follower member to ride the cam surface by means of which the arm may be rotated on its longitudinal axis through a pivot support extending radially from the pivot shaft.

The object of the instant invention is to secure substantially the same movement through an improved mechanism of simple construction in which the normalizing mechanism is self-contained within the arm unit and thereby facilitates its installation in that the added cam member is not separated from the arm.

Another object of the invention is to substantially conceal the normalizing mechanism within an enclosure as shown where the desired alternate longitudinal rotation of the outer blade carrying section of the arm is secured by means of a rocking motion of the arm on its transversal pivot through which the blade carrying arm is spring loaded to cause the blade to follow the surface contour.

Another object of the invention is to minimize the size of the arm and at the same time better protect the functioning mechanism from the weather.

Another object of the invention is to produce an arm interchangeably usable on the standard arm carrying pivot shaft mounting where the arm adjustment is secured by merely pressing the fluted arm head over a serrated drive burr member.

A further object of the invention is to provide a wiper actuating arm incorporating a wiper normalizing mechanism adapted for mounting and demounting as a unit on its driving shaft to facilitate its installation.

The foregoing and other objects of the invention will manifest themselves as this description progresses, reference being made therein to the accompanying drawing, wherein FIG. 1 is a fragmentary perspective view of an automobile equipped with the improved wiper arm;

FIG. 2 is a fragmentary vertical sectional view depicting the wiper arm in side elevation of one embodiment;

FIG. 3 is an enlarged fragmentary view of this modification, with portions shown in section to more clearly show the invention;

FIG. 4 is a transverse sectional view taken about on line IV—IV of FIG. 3;

FIG. 5 is a similar view taken about on line V—V of FIG. 2;

FIG. 6 is a fragmentary view of a modified arm; and

FIGS. 7 and 8 are transverse sectional views about on line VII—VII of FIG. 6, FIG. 7 showing the position controlling cam on the frontal area of the windshield, and FIG. 8 showing the position controlling cam for holding the wiper normal to the surface of the lateral area of the windshield.

Referring more particularly to the drawing, the illustrated windshield has a frontal area 1 and a side area 2 and a merging corner area 3 of an irregular or compound curvature, such as may be found in the currently used panoramic type. The wiper or wiping blade 4 is flexible in character for readily conforming to the surface contour under the spring pressure of its actuating arm as the latter is oscillated thereover by the motor 5 acting through a transmission 6 and an oscillatory shaft 7.

The preferred embodiment of the wiper actuating arm of the present invention shown in FIGS. 1 through 5 comprises a mounting section 8, that has a socket 9 for fixedly receiving the fluted head 10 of the shaft, and a wiper carrying section 11 which includes a rockable part 12 and a channeled contour pattern part or cam member 13. The mounting section 8 is secured to the shaft by a spring latch 14 that engages beneath the shaft head 10. The rockable part 12 is in the form of a clevis having a stub shaft 15 receiving support in the mounting section where it is retained by a split ring 16. Underlying the clevis or rockable part 12 is a supporting shelf 17 rigid with the section 8 and having a flat bearing surface that extends longitudinally of the arm and on which the pattern cam member 13 rides lengthwise of the arm for laterally rocking the wiper carrying section 11. The two parts 13 and 17 constitute a wiper normalizing means. If desired, the bearing surface 17 may be formed with the pattern contour for cooperating with a bearing surface on the part 13.

The pattern cam member depicted in FIGS. 1 through 4 comprises a pair of longitudinally spaced and laterally offset lobes 18 and 19, the latter riding longitudinally along the side marginal portions of the flat bearing surface 17, contacting the same at diagonally opposite points with respect to the pivot pin 20 which joins the two arm sections 8 and 11 together. The cam lobes of this pair are fixedly related and may be formed on the side flanges 21 and 22 of the cam member 13. The pivot pin 20 is placed substantially midway between the lobes and, consequently, when the outer end of the oscillating arm rises and falls in accordance with surface contour changes the lobes will rotate about the axis 20 and react upon the supporting shelf 17 to impart a rocking motion to the wiper carrying section 11. The companion lobe serves to limit and control such rocking or wobbling motion to stabilize and hold the wiper normal to the surface being wiped. A suitable spring 23 connects the two arm sections 8 and 11 to apply a wiping pressure to the wiper 4. The spring illustrated is a coiled one disposed in a slot in the bearing shelf and housed within the channeled cam member 13. If desired, the adjacent end of the clevis 12 may be bifurcated to give additional clearance for the spring.

The pivot pin 20 may be detachable to enable replacement of the outer arm section 11 with a differently patterned cam part 13, if desired. This is shown in the modification of FIGS. 6, 7 and 8, wherein the pair of cam lobes 21' and 22' are likewise fixedly related and the pivot pin 20' disposed between them. The lobes are formed on a contour pattern member 13' of spool shape and is adjustably fixed to rotate with wiper carrying arm section 11' as its outer end rises and falls when encountering changes in the surface contour. For adjustably fixing the arm section 11' on the cam member the pivot pin has a head 25 with a knurled taper 26 that bindingly engages on the member and a removable nut. The void between the lobes 21', 22' may be filled in to provide a prescribed shape having lobe-forming portions to accomplish the rocking motion for the wiper carrying section 11. Thrust-receiving spacers 27 serve to prevent the head 25 and the pin shank from binding against the bifurcated portions or ears 28 of the clevis 15' which has pivotal support against an axis extending lengthwise of the arm.

In both embodiments the wiper carrying outer section of the arm is controllably rocked by a pair of cam lobe portions which cooperatively engage the supporting shelf to exert opposing forces thereon for laterally rocking the wiper back and forth to maintain its normal attitude. In the modification of FIG. 6 the supporting shelf 17' overlies the cooperating lobes in contrast to the relation depicted in FIG. 3. In both forms the pair of lobes move about the axis of the pivot pins 20, 20' and cam upon the supporting shelf in a balanced manner.

To give greater flexibility in the use of the normalizing wiper arm unit the outer blade carrying section may include an articulation 29 by which the wiper may be lowered onto the glass surface for full wiping contact therewith. This feature renders the arm readily adaptable to various windshields and cleaner mechanisms. To secure the setting or adjustment washers 30 are inserted to bindingly clamp the channeled walls of the articulated parts by means of a nut 31.

The construction provides a normalizing unit self-contained within the wiper actuating arm which simplifies the installation of the normalizing mechanism. The position controlling cams are patterned in accordance with the curved windshield which the wiper is to serve, and as the outer end of the arm rises and falls with surface contour changes, the springs 23 or 23' will serve to hold the pair of cam lobes in square or full contact with the supporting shelf.

While the foregoing description has been given in detail, it is without thought of limitation since the inventive principles involved are capable of assuming other physical embodiments without departing from the spirit of the invention and the scope of the appended claims.

What is claimed is:

1. A curved windshield cleaner comprising a flexible wiping blade, an oscillatory shaft, a blade actuating arm having a mounting section fixed substantially radially on the shaft and pivotally joined to a blade carrying section for relative movements about longitudinal and transverse axes, position controlling means having pattern cam means on one arm section bearing upon a surface on the other section, and resilient means acting between the arm sections to hold the blade against the surface being wiped and produce relative movement between said cam means and said bearing surface.

2. An oscillatory wiper normalizing actuating arm for moving a carried wiper outwardly across a frontal area and rearwardly over a receding adjoining area of a curved windshield comprising, an inner mounting section oscillatable in a plane substantially tangent to the frontal area, an outer wiper carrying section pivotally connected to the mounting section for lateral rocking movement about a longitudinal axis, position controlling cam means on one arm section rotatable on the other arm section about a transverse axis and having balanced camming contact with said other section at opposite sides of both said axes to so rock the wiper carrying section, and resilient means acting between the arm sections to hold a carried wiper against the surface being wiped and produce relative movement between said cam means and said other section.

3. A curved windshield cleaner according to claim 1, wherein said one section has spaced parts straddling the other section and individually shaped to constitute the pattern cam means for bearing upon said bearing surface.

4. A curved windshield cleaner according to claim 3, wherein said resilient means is a spring located between said straddling parts and acting accordingly upon said cam means and said bearing surface.

5. An oscillatory wiper normalizing actuating arm according to claim 2, wherein said wiper carrying section comprises an inner member connected pivotally to the mounting section and an outer section carrying the wiper, and means connecting the two members for relative adjustment to securely determine a fixed setting outwardly of the cam means for a carried wiper by which the relationship to the windshield areas is fixed.

References Cited in the file of this patent
UNITED STATES PATENTS
2,691,186    Oishei _____ Oct. 12, 1954